Patented Jan 20, 1953

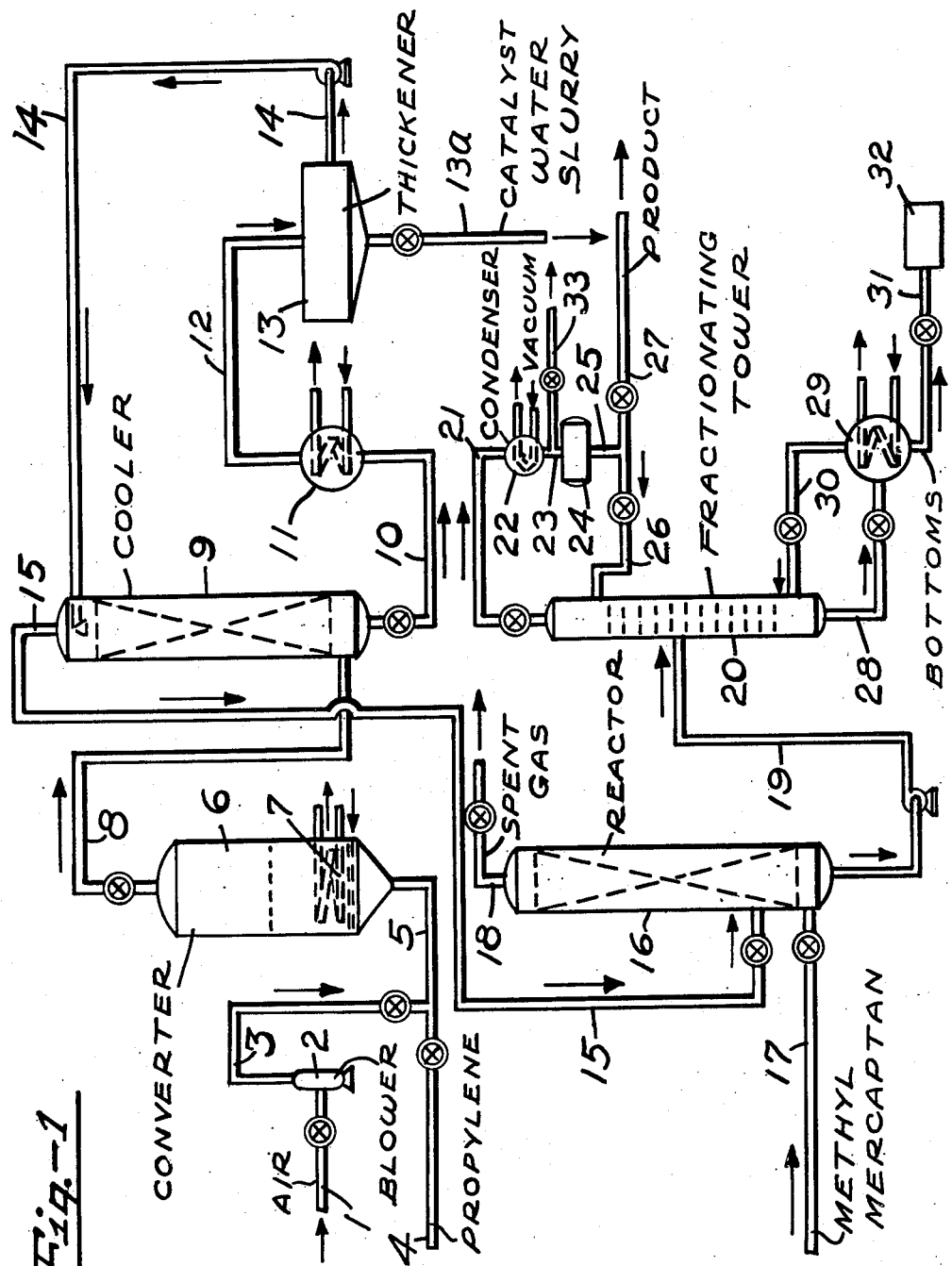

2,626,282

UNITED STATES PATENT OFFICE 2,626,282

VAPOR PHASE PRODUCTION OF BETA-METHYLMERCAPTOPROPIONALDEHYDE

Mary E. Cunningham, Red Bank, and Leland K. Beach, Westfield, N. J., assignors to Standard Oil Development Company, a corporation of Delaware Application October 5, 1949, Serial No. 119,666

5 Claims. (Cl. 260—601)

This invention relates to a novel method for the preparation of beta-methyl mercaptopropionaldehyde by the reaction of methyl mercaptan and acrolein.

It has been discovered that in the manufacture of beta-methyl mercaptopropionaldehyde from methyl mercaptan and acrolein, it is highly preferable to carry out the reaction in the vapor phase, particularly by allowing the acrolein, as it issues in a vapor stream from a propylene oxidation zone, to react directly with the mercaptan.

Acrolein frequently occurs in varying amounts in gas streams either as an unwanted contaminant preventing the gas from being set free into the air or as the desired component to be recovered. An example of the latter is the production of acrolein as an oxidation product of propylene, a very good method for preparing acrolein, or as a dehydrogenation product of allyl alcohol.

In the past it has frequently been difficult and sometimes impossible to isolate these unsaturated aldehydes such as acrolein with good recovery and in a satisfactory state of purity. These difficulties, in general, are those expected when handling highly reactive compounds. Unsaturated aldehydes, particularly those having the olefinic double bond in the alpha-beta position to the carbonyl grouping, a typical example being acrolein, are especially susceptible to isolation difficulties since they readily undergo degradative oxidation, polymerization, and condensation reactions. This decomposition is accelerated when free oxygen or other oxidizing materials are present with the unsaturated carbonyl compounds.

Various expedients have been proposed to avoid or overcome this instability. One of the most common methods for preventing decomposition especially of aqueous mixtures which are to be exposed to the action of oxygen is the addition of certain common types of anti-oxidants. This method is not completely effective and furthermore the use of an anti-oxidant leads to an additional separation and purification problem, particularly when the acrolein is to be used as a reactant in further chemical processes.

One of the best and most economical methods for the commercial production of acrolein on a large scale from readily available raw materials is by catalytic oxidation of hydrocarbon streams particularly those having a relatively high propylene content.

There are numerous ways reported for carrying out this oxidation. Among the catalysts which have been suggested for this oxidation are included cuprous oxide, silver selenite on asbestos with copper oxide, mercury compounds and selenium and copper. One especially preferred catalyst which has been found to be very excellent for the oxidation of propylene to acrolein is silica gel impregnated with copper compounds. This catalyst and the processes for using it are disclosed and claimed in a copending application, Serial No. 27,148, filed May 14, 1948, wherein the preferred oxidation method for obtaining acrolein containing gas streams is described in detail.

Other methods for obtaining acrolein in which it is produced as a relatively dilute stream include pyrolysis reactions using as feed such compounds as diallyl ether and dihydropyran.

Methylmercaptan may be synthesized from methyl alcohol and hydrogen sulfide over a catalyst such as thoria or isolated from light refinery gases. Hydrogenation of dimethyl disulfide of cleavage of dimethyl sulfide by $H_2S$ may also be used to produce methylmercaptan.

Beta-methylmercaptopropionaldehyde has a peculiar and outstanding importance as a synthetic chemical since it is an intermediate in the synthesis of methionine, one of the amino acids demonstrated by workers in the field of nutrition to be necessary for proper nutrition of human beings and animals.

It has been known that beta-methylmercaptopropionaldehyde can be prepared by the liquid phase reaction of acrolein and methyl mercaptan. However, to carry out the liquid phase reaction necessitated the condensation of the acrolein since it is obtained as a gas during its preparation by oxidation and the methyl mercaptan, also commonly occurring as a gas, with the accompanying difficulties of by-product formation and loss of yield caused by the time interval involved and the additional operations necessary. For liquid phase reactions it has previously been considered necessary to employ a catalyst. Copper salts and organic amines have been suggested as useful for liquid phase preparation of beta-methylmercaptopropionaldehyde. It has also been considered necessary to use lowered temperatures for the liquid phase reaction, i. e. temperatures below 40° C.

The present method for preparing beta-methylmercaptopropionaldehyde by reacting the starting materials, acrolein and methylmercaptan, in vapor phase has a number of advantages.

One such advantage is that it has been found that the reaction goes easily and readily in the absence of any catalyst or promoter.

A second advantage is that the product, beta-methylmercaptopropionaldehyde, can be obtained in a rather pure state simply by allowing the gaseous reactants to flow together and thereafter isolating the liquid product so formed.

Thirdly, the reaction can be carried out very conveniently and economically by reacting the gases in their normal gaseous state, at temperatures above their condensation points, such as, in the range of 40° C. to 60° C. This is a very useful expedient and finds particular favor in operations where the acrolein to be employed as the reactant is present in reaction product streams as a gas.

In conjunction with this type of operation, it is of further advantage that dilute streams of acrolein and methylmercaptan can be and are, in fact, preferably, reacted together, thereby avoiding the necessity of isolating and purifying the acrolein and methylmercaptan together with the attendant difficulties. For instance, it is considered that this process could be operated as a simple method for recovering acrolein from dilute gaseous streams by first forming the reaction product with methylmercaptan which is readily isolated and subsequently decomposing the product such as by thermal cracking at high temperatures to give acrolein and methylmercaptan as volatile products.

The process as carried out on a plant scale is relatively simple. The two reactants in a gaseous state are passed into a reaction zone; for instance, a column containing packing or plates, at a point and in such manner that there is intimate and thorough mixing to give the beta-methylmercaptopropionaldehyde product. The temperature in the reaction zone should be such that the reactant gases are in a gaseous state but the product, as formed, collects as a liquid. This optimum temperature within the reaction zone will normally be in the range of 40° C. to 60° C., the boiling point of acrolein being 52.5° C., that of methylmercaptan being 7.6° C., and that of the product being 180° C. Although this is the preferred temperature range, the process actually can be operated at temperatures ranging from 20° to 100° C. Obviously, with super atmospheric and subatmospheric pressure conditions, the reaction temperatures must be adjusted accordingly.

Although optimum operation requires use of equivalent proportions of reactants, it is not necessary to control the amounts of gaseous reactants entering the reaction zone with a high degree of criticalness since the reaction to produce the beta methylmercaptopropionaldehyde proceeds satisfactorily in the presence of an excess of either gas. The reaction in the gas phase appears to proceed quite rapidly and completely, all the acrolein introduced in a dilute stream having reacted after less than a minute residence time in the reaction zone.

The liquid material which is formed as product is collected in the reaction zone from which it is removed as the beta-methylmercaptopropionaldehyde. This product may, if desired, be further purified or treated in any manner such as by passing it to a fractionating tower and subjecting it to fractionation. The gases which may be present with the gas streams, that is, the acrolein and methylmercaptan reactant streams, include inert gaseous materials either normally present with the reactants as they occur or are formed, or any which may be deliberately added as diluents. Such gases possibly present are oxygen, nitrogen, water vapor, carbon dioxide, carbon monoxide, hydrogen sulfide, dimethyl sulfide, methanol, dimethyl disulfide, hydrogen, hydrocarbon and an excess of either gas reactant in case exactly stoichiometric amounts of the reactants are not employed. This is a particularly important feature of the invention, since both reactants frequently occur as dilute streams.

Methylmercaptan is commonly available as one constituent of a refinery by-product stream from sulfur-containing petroleum sources and will be accompanied by such gases as hydrocarbons, both saturated and olefinic, as well as by oxygen, nitrogen, and carbon dioxide. As previously mentioned, a preferred method for the preparation of acrolein is by oxidation of a hydrocarbon such as propylene and a product stream produced in such a way, will contain other gases as unreacted propylene, water vapor, oxygen, nitrogen, and carbon dioxide. That these inert diluents do not need to be removed, and are, in fact, useful as a reaction control device by their presence, offers great advantages.

A special feature of this process is that, by reacting acrolein and methylmercaptan, the dilute, vapor phase and selectively forming, a high boiling product, there is eliminated automatically many volatile impurities such as propionaldehyde, hydrogen sulfide, methyl alcohol, etc., which would be present in the product if acrolein and methylmercaptan were first individually isolated and reacted in the liquid state. This process thus has a very effective purification function.

It is a further feature of this invention that the process can be operated in such a manner as to remove acrolein and other unsaturated aldehydes from a gas or to remove mercaptans from a gas. Under certain conditions it is also possible to isolate the reaction products and treat them to regenerate the original aldehyde and mercaptan in a purer state.

Turning attention to the diagrammatic sketch of a preferred embodiment of the invention as shown in Figure 1, air and a hydrocarbon, as propylene, are introduced into oxidation converter 6 by means of blower 2 and lines 1, 3, 4 and 5, equipped with suitable control valves for regulation of gas flow. In converter 6, the gas feed mixture is contacted with an oxidation catalyst. The temperature in the oxidation apparatus is controlled by a suitable means, such as cooling coil 7 or by catalyst circulation to a cooling leg if a fluid process is employed. The gaseous oxidation product vapors containing acrolein with other gases are passed from the oxidation converter 6 via line 8 to a gas cooler 9, wherein they contact countercurrently a water spray introduced by line 14. From the lower portion of the gas cooler 9, by line 10 there is removed an aqueous slurry of the oxidation catalyst which is carried over in the gas from the oxidation reactor. This catalyst slurry goes to cooler 11, thence by line 12 to a catalyst thickener 13 from which a catalyst-water slurry is removed by line 13a and water separated from the slurry in the thickener is carried back to gas cooler 9 by line 14.

From the upper portion of gas cooler 9, line 15 carries the cooled gas into a lower portion of reactor 16. There is also introduced into reactor 16 at a lower point, a gas stream containing methyl mercaptan, preferably admixed with inert diluent gases by line 17. Within reactor 16 the methylmercaptan and acrolein react to produce beta-methylpropionaldehyde. Spent, inert gases are removed from the upper part of reactor 16 by line 18. The product is removed, as a liquid by line 19 from a lower portion of the reactor below the points of introduction of the gases reactants. This liquid product is passed to a vacuum fractionating tower 20. This vacuum fractionating tower is controlled and operated such that the beta-methylmercaptopropionaldehyde passes overhead by pipe 21 to a condenser 22, via line 23 to a liquid receiver 24. From the receiver 24, a part of the liquid is returned by lines 25 and 26 to the tower 20 as reflux and a part is removed from the system by line 27 as product. Line 33 leads to a steam ejector or other source of vacuum.

From the lower portion of tower 20 by line 28 a high boiling polymer bottoms material is removed and passed to an external heater 29 from which a part is removed via line 31 as a purge. The polymer may be stored in tank 32 and thermally decomposed later. A part of the bottoms is recycled by line 30 from heater 29 to supply heat to a fractionating tower 20.

The invention will be described in more particularity by the specific examples set forth below.

Example 1

A three-liter bulb was evacuated and 200 mm. (Hg) pressure of acrolein was introduced into it together with a trace of triethylamine to function as a catalyst. Methylmercaptan was then added to bring the bulb contents to atmospheric pressure. The reaction took place as soon as the addition of the methylmercaptan was started and at the finish of the addition a few ml. of a water-white liquid had collected inside the bulb. This liquid was the adduct, B-methylmercaptopropionaldehyde. No acrolein was left in the vapor phase and the amount of product obtained corresponded to a theoretical yield of the adduct, that is, a yield of 100%.

Example 2

In order to determine whether the reaction would occur in the vapor phase without the aid of a catalyst, the same procedure as for Example 1 was followed except that no catalyst was added to the carefully cleaned bulb, and again the liquid was produced within the bulb.

The 2,4-dinitrophenylhydrazone derivative of this substance had a melting point of 118.5–120.0° C. The literature reported the melting point of this derivative of beta-methylmercaptopropionaldehyde to be 116°–119° C. The derivative was subjected to an elemental analysis which compared closely with the theoretical as shown in Table I below:

TABLE I

*Analysis of the 2,4-dinitrophenylhydrazone derivative*

| Theoretical for 2,4-dinitrophenylhydrazone for beta-methylmercaptopropionaldehyde | Found for sample |
|---|---|
| | Percent | Percent |
| C | 42.20 | 42.25 |
| H | 4.22 | 4.33 |
| S | 11.26 | 11.32 |

Thus the identity of the product from the vapor phase non-catalytic reaction of acrolein and mercaptan was shown to be beta-methylmercaptopropionaldehyde.

Example 3

The following experiment was to determine whether the reaction would proceed under dilute gas conditions. The exit gas stream from a propylene oxidation unit was led without drying to the bottom of a 1″ i. d., 3-ft. long column packed with glass beads and water-jacketed. The gas stream contained a little over 1% acrolein; also about 8% water, 6% propylene, 6% carbon dioxide, 10% oxygen and the balance nitrogen. The column temperature was kept at 40°–45° C. Methylmercaptan in an amount slightly in excess of the amount of acrolein, was fed into the column. The liquid product condensed on the beads and drained into the lower portion of the column. The unit was run for 15 hours and the product collected. The 2,4-dinitrophenylhydrazone of the crude product melted at 116.8–119.4° C. Vacuum distillation data for the crude product are listed in the following Table II.

TABLE II

*Vacuum distillation of crude beta-methylmercaptopropionaldehyde*

| Fraction | B. P., °C. | Pressure, mm. Hg | Percent of material recovered |
|---|---|---|---|
| 1 | 28–51 | 10 | 3.95 |
| 2 | 51–52 | 10–6 | 60.30 |
| 3 | 52–54 | 6–5 | 12.65 |
| Ice trap | | | 6.40 |
| Bottoms (polymer) | | | 16.70 |
| | | | 100.00 |

Example 4

Referring once again to Figure 1, a specific example of the invention is described herewith.

The invention is particularly adapted to the use of acrolein prepared by the oxidation of propylene. Air is passed through line 1 to blower 2 and thence through lines 3 and 5 to oxidation reactor 6. A propylene containing stream is passed through line 4 and line 5 into oxidation reactor 6 with the air. In oxidation reactor 6, the air-propylene feed mixture is contacted with a solid catalyst to effect the oxidation of propylene to acrolein. Certain critical features must be controlled to obtain good selectivity to acrolein. The amount of oxygen used is above that theoretically required for the reaction. A preferred air-propylene ratio is about 90/10. Other diluents than nitrogen, such as steam, paraffinic hydrocarbons, such as methane, ethane, propane, or the like, if desired, may be employed, particularly since these materials do no harm in the subsequent step of reacting the acrolein.

The catalyst which has been found to best oxidize the propylene to acrolein is silica gel impregnated with copper compounds, such as copper oxide or copper phosphate. Other copper compounds, such as cuprous sulfate, cupric sulfate and copper metallates may also be used. Copper oxide is one of the preferred copper compounds. Promoters, such as metallic oxides may also be used. Cadmium oxide and barium oxide have been found particularly suitable. The oxidation converter 6 is equipped with cooling means such as coil 7 to insure proper temperature control. Temperatures of 200° C. to 400° C. have been found practical for the oxidation of propylene to acrolein although the preferred range is 250° C.–320° C. Pressures of 10 p. s. i. g. are conveniently employed within the reactor.

The gaseous oxidation product stream is passed from converter 6 through line 8 to the lower portion of gas cooler 9 wherein the hot gas stream, containing nitrogen, steam, carbon dioxide from the air, excess unreacted oxygen and propylene, and acrolein is contacted countercurrently with a spray of cooling water introduced into the cooler by means of line 14. The cooled gases, consisting of a dilute stream of acrolein, are passed overhead from the cooler through line 15 into a lower point of reactor 16 which preferably takes the form of a packed column or a tower containing plates, wherein the propylene contacts a dilute stream of methyl mercaptan gas introduced into the lower part of the reactor via line 17. The methylmercaptan stream may conveniently be a dilute stream of refinery origin, for instance, as obtained from the caustic soda regenerator of a sulfur removal process. The temperature control maintained within the reactor is preferably variable such that there is a temperature gradient, the lower portion of reactor 16 being hotter with decreasing temperatures toward the upper portion, cooling being necessary. It is desirable to maintain the lower portion of the reactor at a temperature of around 80° C.–100° C., that is, well above the condensation point of the gases and preferably above the condensation temperature of water, while in the upper section, the temperature should be 20° C.–40° C., or even lower to permit removal of excess reactants as gases but, at the same time, low enough to prevent any loss of product by way of spent gas outlet line 18. It may be necessary to supply internal cooling in order to achieve this cool temperature zone. Within the reactor 16 the acrolein and methyl mercaptan react immediately on contact and quantitatively to yield as a liquid product, beta-methylmercaptopropionaldehyde. This liquid product is removed via line 19 from the bottom of the reactor 16 and passed into an intermediate section of a vacuum fractionating tower 20 equipped with plates and inlet and outlet lines for purifying the crude beta-methylmercaptopropionaldehyde. The tower 20 is operated at subatmospheric pressure. There is removed overhead via line 21 the crude beta-methylmercaptopropionaldehyde and volatile impurities, which mixture is passed to condenser 22, through line 23 to liquid receiver 24 by line 25. A part of the liquid condensate from line 25 is removed by line 27 from the system and a part is preferably recycled by line 26 back to the tower as reflux. Line 33 leads to a steam ejector or other source of vacuum for the tower 20. From the bottom of tower 20 by line 28 there is removed a liquid bottoms containing materials boiling above the product.

A portion of this is passed through external heater 29 and back to the tower by line 30 to supply the necessary heat, while the remainder is removed by line 31 to storage tank 32. These polymeric substances may be cracked later.

As a desirable alternate method, the fractionating tower 20 may be operated as a stripping zone to remove impurities more volatile than the product. The beta-methylmercaptopropionaldehyde product and polymeric materials are removed from the bottom of the tower. This impure product is best purified by a vacuum fractionation.

What is claimed is:

1. A continuous process for the preparation of substantially pure beta-methylmercaptopropionaldehyde which comprises oxidizing propylene catalytically with air, cooling the hot reaction product vapor stream by countercurrent contact with water, passing the cooled reaction products vapor stream to a reaction zone, simultaneously passing a dilute vapor stream of methylmercaptan into said reaction zone, maintaining a temperature gradient within the reaction zone in a range from 40° C. to 60° C., the gaseous reactants entering at the hotter portion of said reaction zone removing from the hotter portion of said reaction zone a liquid product consisting essentially of beta-methylmercaptopropionaldehyde, and removing from the cooler portion of said reaction zone the spent gaseous diluent.

2. A process as described in claim 1 in which the said liquid product is further purified by passing it to a fractionating tower from which the impurities more volatile than the beta-methylmercaptopropionaldehyde pass overhead; and the beta-methylmercaptopropionaldehyde is the liquid bottoms product.

3. A process for the preparation of beta-methylmercaptopropionaldehyde from acrolein vapor diluted in a gas stream by water vapor, propylene, carbon dioxide, oxygen, and nitrogen as gaseous diluents, which comprises admixing gaseous methyl mercaptan with said gas stream of diluted acrolein vapor, passing the resulting mixture through a reaction zone at temperatures of 40° C. to 60° C. wherein the acrolein and methyl mercaptan are maintained in the gaseous state, forming beta-methylmercaptopropionaldehyde immediately by the reaction of the gaseous methyl mercaptan with the gaseous acrolein in the reaction zone, condensing the beta-methylmercaptopropionaldehyde to a liquid as it is formed in the reaction zone, withdrawing the liquid beta-methylmercaptopropionaldehyde product from said reaction zone, and withdrawing the remaining gaseous diluents free of acrolein from the reaction zone.

4. The process as described in claim 3 in which the reaction zone is maintained free of added catalyst and free of liquid other than the beta-methylmercaptopropionaldehyde product formed therein.

5. The process as defined in claim 3, in which a small amount of methyl mercaptan is removed with the diluents of said gas stream free of acrolein from the reaction zone as a slight proportional excess of methyl mercaptan over that admixed for reaction with the acrolein.

MARY E. CUNNINGHAM.
LELAND K. BEACH.

REFERENCES CITED

The following references are of record in the file of this patent:

UNITED STATES PATENTS

| Number | Name | Date |
| --- | --- | --- |
| 2,485,236 | Gresham et al. | Oct. 18, 1949 |
| 2,523,633 | Pierson et al. | Sept. 26, 1950 |